United States Patent [19]

Goodwin, Jr.

[11] 4,025,325
[45] May 24, 1977

[54] PORTABLE VENTILATING AIR FILTERING DEVICE FOR TOILETS

[75] Inventor: Vernon Goodwin, Jr., Seattle, Wash.

[73] Assignee: Pleasantaire Industries, Ltd., Seattle, Wash.

[22] Filed: Dec. 29, 1975

[21] Appl. No.: 644,502

[52] U.S. Cl. .............................. 55/357; 55/385 R; 55/472; 4/209 FF; 4/217

[51] Int. Cl.² ...................................... B01D 46/10

[58] Field of Search ............... 55/357, 385 R, 472, 55/279; 4/209, 216, 217, 213, 209 FF

[56] References Cited

UNITED STATES PATENTS

| | | | |
|---|---|---|---|
| 1,774,156 | 8/1930 | Root | 4/313 |
| 1,840,539 | 1/1932 | Small et al. | 4/213 |
| 2,727,249 | 12/1955 | Kochert | 4/213 |
| 3,295,147 | 1/1967 | Meyer | 4/213 |
| 3,366,979 | 2/1968 | Johnston | 4/213 |
| 3,585,651 | 6/1971 | Cox | 4/96 |
| 3,790,970 | 2/1974 | Bendersky et al. | 4/217 |
| 3,849,808 | 11/1974 | Olson et al. | 4/213 |
| 3,857,119 | 12/1974 | Hunnicutt, Jr. | 4/217 |
| 3,869,737 | 3/1975 | Stevenson | 4/213 |

Primary Examiner—Frank W. Lutter
Assistant Examiner—David L. Lacey
Attorney, Agent, or Firm—Christensen, O'Connor, Garrison & Havelka

[57] ABSTRACT

A portable, toilet ventilating, air-filtering device for boats, house trailers, motels and the like, in which the housing interior is divided into opposite pressure-equalizing plenums by transverse partitioning filter means, and in one of these plenums is mounted a rotatively and vertically adjustable intake duct with spatulate nozzle head that can serve as a carrying handle when nested retracted against the housing top. A suction-blower mounted in communication with the opposed plenum draws air from the toilet bowl and through filter panels for discharge through a bottom opening into a discharge duct recessed in the bottom exterior.

11 Claims, 8 Drawing Figures

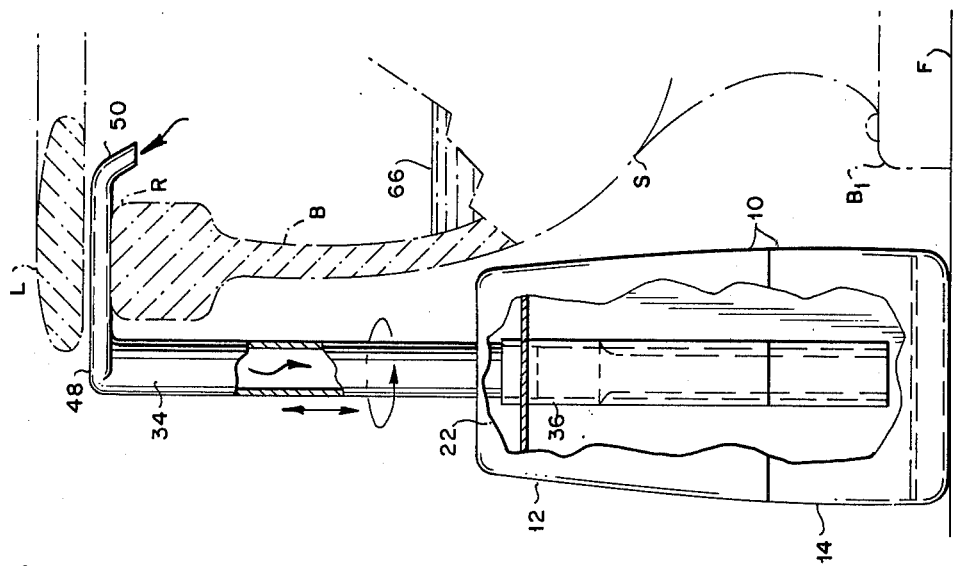
FIG. 2
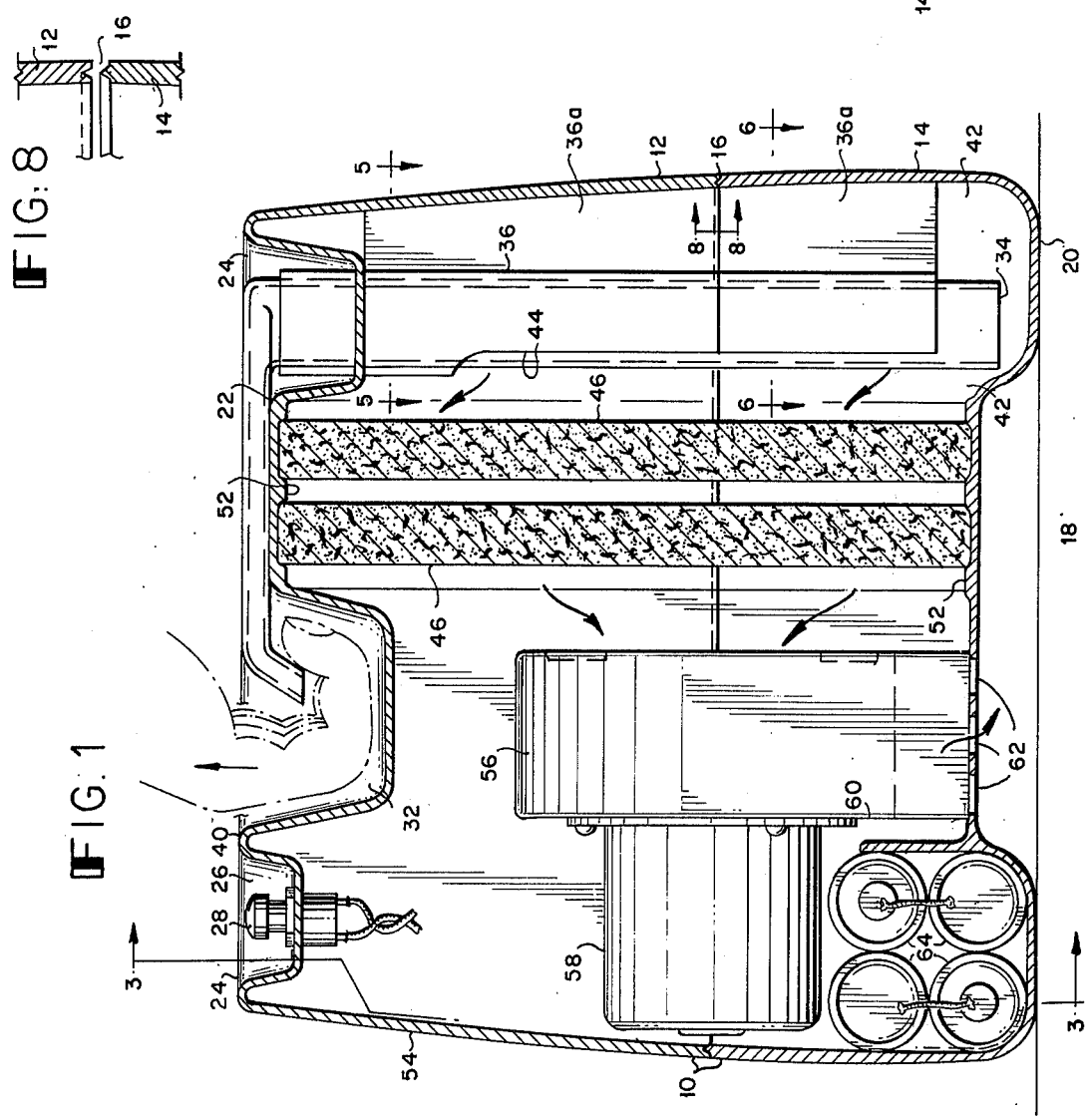
FIG. 1
FIG. 8

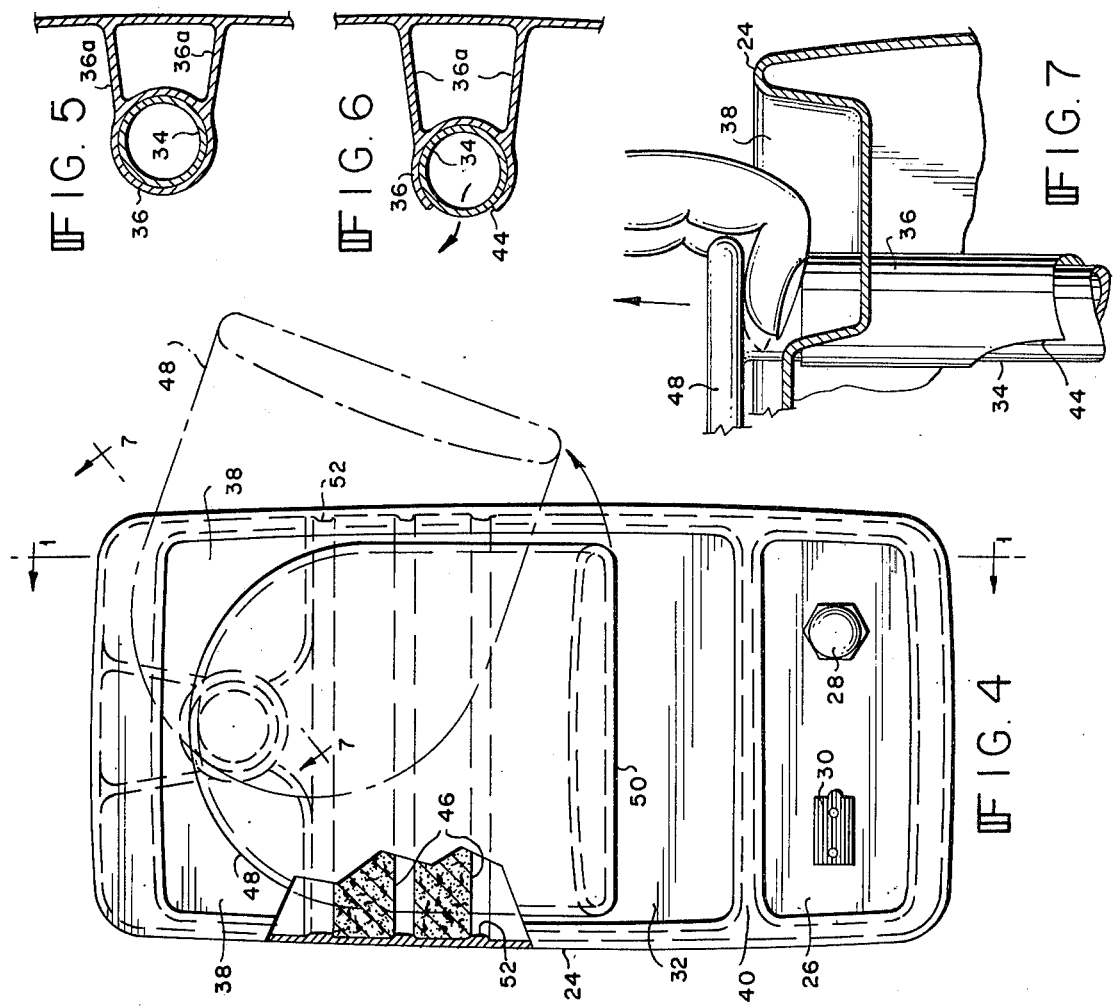
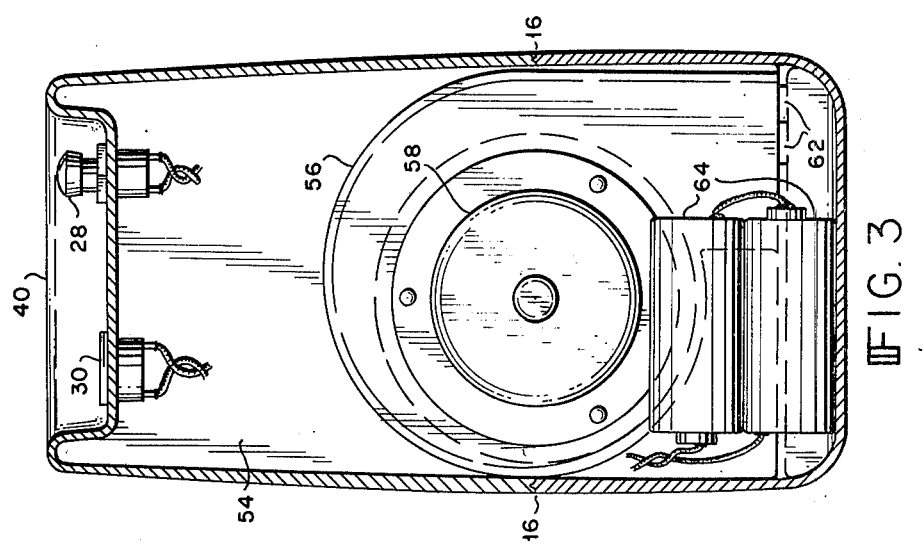

PORTABLE VENTILATING AIR FILTERING DEVICE FOR TOILETS

BACKGROUND OF THE INVENTION

This invention relates to improvements in ventilating deodorizing filters to be used with toilets in house trailers, campers, mobile homes, boats or other installations wherein confined living spaces and inadequate ventilation make fetid air particularly disagreeable. The invention is herein illustratively described by reference to its presently preferred embodiment; however, it will be recognized that modifications and changes with respect to details may be made without departing from the essential features involved.

The concept of toilet bowl, forced-air ventilators in stationary installations is old in the art, as is that of movable filter units that can be positioned next to a toilet stool to operate from an external power source with the toilet in use without benefit of exterior venting of the effluvium. Examples of such ventilating deodorizers are found in the following U.S. Pat. Nos. 1,774,156, Root (1930); 3,366,979, Johnston (1968); 3,857,119, Hunnicutt, Jr., (1974); 3,869,737, Stevenson (1975). There has long been continued recognition of need for a fully versatile and compact self-powered portable deodorizer unit of this type. Seemingly, the efforts of many over the years to devise such a unit with advantages outweighing disadvantages sufficiently to precipitate widespread adoption and use have left considerable room for improvement and innovation, particularly in combining such attributes as operating convenience, compactness, versatility and efficiency applicable in the widely varying spatial arrangements and types of toilet stool installations to be served; practical and visually attractive conformation that is both convenient to carry and position, and is compact for storage and for operative placement in confined spaces; and a unit easy to clean and service so as to encourage its consistent presence and usage.

A broad object hereof is to achieve these and related attributes in a portable, fully self-contained toilet ventilating air deodorizer suitable for commercial production and of general utility. More especially, it is an object to provide an internally powered blower-filter unit of such compact and versatile configuration that a unit of one design may be mass-produced to serve most, if not all house trailers, cabin cruisers, campers, cottages and similar installations having widely varying space accommodations.

A further object hereof is to provide a novel organization and housing arrangement for a retractable air inlet nozzle head and duct receiving assembly, plenum chamber, filter, and suction blower in such a deodorizer unit enabling the device to be of highly compact and conveniently proportioned exterior form while possessed of high volumetric air processing capability for its size and energy requirements. A related object is to devise such a unit with a compactly stowable air intake duct and nozzle assembly which, when extended, can be elevated to any required height, and rotated by any necessary amount relative to the unit cannister or housing, the placement of which is often governed by space limitations, in order to conduct effluvium from the toilet bowl to the filter unit, and also serve as a steadying support for the device in whatever position it is placed for convenience adjacent the stool. Thus, the unit can be positioned conveniently in any location, however confined the space and when used on a boat or in a camper underway, the unit is stabilized against tipping over. Moreover, when fully retracted and oriented with its intake nozzle in an inboard stowed position, the intake duct and nozzle assembly is essentially accommodated within the physical outline and profile of the cannister and thereby does not add projecting surfaces or objectionable height or width to the compact unit; and moreover in that position may be used as a convenient carrying handle.

Functional, segmented construction of the housing or cannister portion of the deodorizer unit, together with related placement of principal components within the same, facilitates assembly and disassembly and convenient access to such components for inspection and servicing thereof when desired.

SUMMARY OF FEATURES

In accordance with this invention achieving the above and related objectives, the deodorizer unit housing or cannister is rectangular in horizontal cross section with a receiving plenum at one end in which is mounted an upright guide slidably supporting a round tubular intake duct. Vertically and rotatably adjustable in its support guide, the tubular intake duct communicates through its open lower end with the plenum chamber directly through a sidewall opening in the guide in any adjusted position of the duct. At the intake duct's upper end is a transversely disposed nozzle head. The nozzle head is thin vertically and broad or spatulated horizontally, and has a downturned inlet extremity that can hook securely over the inside edge of a toilet bowl rim upon which the nozzle head rests, when the head is received between the lowered tiolet seat and the rim. Thus held stably between the seat and rim of the toilet, the nozzle-inlet duct assembly in turn stabilizes the floor-supported cannister standing on the floor adjacent the side of the bowl. As a further feature, retraction of the intake duct and rotative orientation of the nozzle head to overlie the cannister nests the nozzle head in a top recess wherein such nozzle head is accessible as, and because of its form can serve as, a carrying handle. Without benefit of latch or detent, the cantilever movement of the nozzle head serving as a handle by which to lift the cannister holds the weight of the entire unit by friction in the guide and thus further simplifies the overall manufacture.

Upright filter panel means disposed transversely across the breadth and extending the height of the cannister's interior adjacent the receiving plenum divide that end region from the opposite end region occupied by the suction-blower, its batteries and the blower inlet plenum adjacent the blower intake. Preferably, the blower discharges through the floor of the cannister into a transversely extending subfloor channel, opening laterally at opposite sides of the unit. With such a dual-plenum suction-blower and filter configuration and arrangement, substantially the full area of the filter panel means is utilized to pass and filter air drawn by the blower-created pressure differential. As a result the desired high degree of compactness of the unit is obtainable along with adequate processing volumetric capacity, a low overall height, and a highly convenient shape (narrow in relation to its length) enabling it to be placed in an out-of-the-way location and in the most confined of spaces because it can be accommodated partially beneath the overhang and closely alongside the toilet bowl in almost any installation.

A transverse horizontal parting line at which complementally formed upper and lower essentially half-shell segments of the cannister or housing of the unit interengage at an airtight joint the parts of which can be separated so as to permit opening the housing for convenient and direct access to the interior filter panels and blower assembly, including its batteries, for inspection and repair when desired. At the same time, the filter panels, held laterally between framing ribs inside the housing segments, may be removed for cleaning or replacement.

These and other features and advantages of the invention will be recognized from the description that follows based on the accompanying drawings.

DESCRIPTION OF THE DRAWINGS

FIG. 1 is a sectional side view of the deodorizing filter unit, taken along line 1—1 in FIG. 4, the view also showing by broken lines a person's hand grasping the retracted and stowed nozzle head serving as a carrying handle.

FIG. 2 is an end view of the unit shown in FIG. 1, with parts broken away and with the nozzle head shown extended into operating position ready for use in cooperation with a toilet stool shown in the same view by broken lines.

FIG. 3 is a sectional end view of the device.

FIG. 4 is a top view of the device with parts broken away and with the nozzle head shown by solid lines in its stowed position ready for use as a carrying handle, and by broken lines partially extended and rotated out of stowed position.

FIGS. 5 and 6 are fragmentary sectional details taken respectively along lines 5—5 and 6—6 in FIG. 1.

FIG. 7 is a fragmentary sectional view taken on line 7—7 in FIG. 4 to illustrate formation of the cannister top and nozzle head to facilitate grasping and lifting the latter axially from its stowed position in such a manner that the inlet duct does not bind frictionally in its guide.

FIG. 8 is a fragmentary sectional view taken on line 8—8 in FIG. 1 to illustrate the housing joint.

DETAILED DESCRIPTION OF ILLUSTRATED EMBODIMENT

With reference to FIG. 2, conventional toilet stool S includes a bowl B having an upper rim R covered by a seat or lid L hinged at its rear edge to the top and back of the bowl (not shown). The bowl has a base $B_1$ bolted to the floor F of the boat, house or other structure. Cushioning spacer shims (not shown) support the lid L a short distance above rim R. As in some prior ventilator device proposals designed for withdrawing fetid air from the bowl interior so as to ventilate the same with fresh room air, the gap between the seat L and bowl rim R accommodates a vertically thin and horizontally broad intake nozzle head of the filter device to be described herein.

In its preferred form, cannister or housing 10 is rectangular in horizontal cross section. Preferably its width approximates a third its length and its height approximates its length. The housing comprises upper and lower "half-shell" sections 12 and 14 molded of synthetic plastic material detachably joined together by airtight joint edges along intermediate horizontal line 16. FIG. 8 illustrates one form of joint suitable for the purpose. In this illustrated form the joint edges are not formed to hold together of themselves and it is thus necessary to provide suitable latches (not shown) such as conventional latches or screws to secure the upper and lower housing sections together releasably. While contoured for aesthetic reasons and secondarily for ease in molding, the housing sides and ends are generally flat and upright and, except for a transverse underfloor air discharge channel 18 located intermediate its ends, the housing bottom 20 is flat so that the unit will rest stably on a floor surface F. Housing top 22 is generally flat, with a peripherally extending rim 24 at its uppermost extremity. A recess 26 is formed in the top near one end of the housing in which a blower switch 28 and battery-recharging electrical socket 30 are mounted. At its mid-portion, the housing top has a deeper and longer recess 32 which extends nearly the full width of top 22 and serves to accommodate the intake nozzle head tip (to be described) when the latter is depressed and swung inwardly into stowed position. The recess 32 affords finger clearance beneath that nozzle tip when the nozzle head is to be used as a carrying handle as shown by broken lines in FIG. 1. When so used, lifting force exerted on the projecting end of the nozzle head exerts a cantilever moment with resultant friction force on the intake duct 34, which binds it frictionally in its guide 36 without necessity of a latch or detent for keeping the same in its retracted, carrying position. At its end opposite the switch recess 26, the cannister top has two additional recesses 38, one on each side of guide 36 and somewhat shallower than recess 32. These recesses 38 allow the user's fingers to be inserted (FIG. 7) beneath the retracted intake nozzle head sides adjacent the duct 34. When grasped at this location, the head can be lifted from its retracted position readily with minimal frictional resistance, as opposed to that utilized to bind the intake duct in its guide when carrying the unit as just described. The transverse edge rim 40 projects upward sufficiently to protect the switch 28 and electrical charging receptacle 30, as well as the nozzle head when the latter is fully retracted and swung inboard into its carrying position (FIG. 1).

Interiorly, one end of housing 10 affords a receiving plenum 42 extending the entire interior width and height of the housing interior and a fraction, such as slightly more than one-third, of its length. In this open plenum 42 is situated an upright tubular guide 36 that slidably supports the intake duct 34. The guide 36 is open at top and bottom and held in place by upright generally radial connecting webs or struts 36a that are molded integrally with the adjacent housing end wall and the guide 36 (FIGS. 5 and 6). Guide 36 has aligned upper and lower parts molded integrally with the housing sections. It protrudes a short distance above the housing top to a height below the top rim 24. A longitudinal slot 44 of suitable width, such as 90° of the circumference of the round tubular guide 36, extends most of the length of such guide within housing 10 along that side of the guide tube facing the housing central interior. This open slot thus affords a direct and immediate flow path for air discharging from the open lower end of round intake duct 34 to flow into plenum 42 in all vertically and rotatively adjusted positionings of duct 34.

Air to be drawn for processing through filter panels 46 is led into duct 34 through the above-mentioned intake nozzle head 48 that projects transversely from the upper end of duct 34. Preferably the interior cross section of head 48 approximates or exceeds that of duct 34. The extremity or tip 50 of nozzle head 48 is turned downward as shown, so that when the nozzle head is operatively positioned it will lap downwardly over the inside edge of toilet bowl rim R. As such it helps hold and stabilize the cannister 10 and forms a short, downwardly-directed inlet orifice that will withdraw air from above water level 66. Where it joins the tube 34 (FIG. 4), the end of spatulate shaped nozzle head 48 has a circular arc plan configuration with its end extremity externally tangent to the projected circular outline of round intake duct 34. The rounded lobes thus formed adjacent the tube provide a convenient finger hold for lifting the nozzle head (FIG. 7).

Fetid air drawn into plenum 42 spreads over the entire exposed area of the adjacent filter panel 46. Panels 46 are held in upright position by marginally extending ridges 52 molded in the housing interior wall surfaces so as to completely frame and hold the filter panels between them and block leakage of fetid air around the filters. Activated charcoal and/or other odor filtration material that will purify and cleanse the air of its objectionable odors may be used in these filter panels. In order to maximize the useful flow-through and processing capacity of the units while observing the requirement for compactness, preferably the entire vertical cross-sectional area of the housing interior from top to bottom and from side to side represents the filtration flow path and is occupied by these filters. By reason of the dual plenum arrangement equalizing, as far as practical, the pressure differential across all areas of the filters, maximum filtration efficiency is attained.

Pressure distribution tending to equalize the processing rate throughout the area of the filter panels is achieved by the giving over of both ends of housing 10 to plenum chamber functions. The receiving plenum 42 has already been mentioned. It is occupied only by guide tube 36 but is otherwise open throughout to the frontal area of adjacent filter 46. Similarly the opposite collecting plenum 54, while accommodating suction-blower 56, is otherwise open to substantially the full area of adjacent filter 46. These open plenums permit pressure to approach equalization over substantially the entire face of the adjacent filter panel and thus enable the apparatus to operate with approximately uniform differential pressure acting across the filters in all areas thereof subjected to flow.

The full benefit of filtration capability of the filters is thus achieved and, for the blower energy expended, the maximum flow volume attained. Preferably blower 56 is of the central intake, centrifugal-drum-type having a low-voltage DC electric motor 58 integral with the housing, which housing has a tangential exterior discharge outlet 60. The central intake of blower 56 preferably faces in a direction aligned with the direct flow path from filter panels 46. The open area of plenum 54 thus not only will effect equalization and spatial balance of suction pressure across the face of adjacent filter panel 46, but will provide optimum space utilization for the motor and batteries. The blower discharges the now odor-free air downwardly through the floor openings 62 into the lateral duct 18, dispersing the air outwardly from opposite sides of the housing bottom.

Rechargeable batteries 64 are incorporated for energizing the motor 58 in blower unit 56 of this portable device. Conveniently, these batteries are suitably mounted at the bottom of the housing at the same end as the blower motor 58. Center of gravity is thereby maintained low in the unit for better stability. In this configuration associated electrical connections can most conveniently be made to the motor, the switch 28, and to the recharging terminal 30.

The described segmentation line 16, between upper and lower portions of the cannister or housing shells, is so located approximately half-way between top and bottom that removal of the upper section 12 immediately exposes the blower assembly, and beneath it the batteries, for servicing and inspection. It also opens the upper holding frames 52 for the filter panels, permitting either one or more to be withdrawn vertically from the lower section 14 if desired. Thus, this segmental housing, in addition to being readily molded, generally affords access to all interior reaches of both plenum spaces and components in the housing for inspection and servicing as needed.

In operation, the portable self-contained deodorizing unit, compact and convenient to handle as a small valise, can be placed on the floor closely adjacent to a toilet, however confined or oddly shaped the available space. The nozzle head is grasped, as in FIG. 7, elevated, rotated, then depressed to rest upon and hook over the toilet bowl rim R as in FIG. 2 where it remains. The cannister itself, preferably not much more than half the height of a toilet bowl for reasons of compactness, may then be nudged into final position closely against, and partly beneath, the overhang of the bowl B, where it is out of the user's way and virtually out of sight, especially when located near the rear of the bowl. When switch 28 is pressed to start the motor-blower, air is drawn from the toilet bowl into and through nozzle head 48 and duct 34 into plenum 42, entering the latter without resistance through guide tube slot 44. In plenum 42 pressure tends to equalize across the entire face of adjacent filter panel 46, a relatively large area. The suction-producing blower creates a reduced pressure in its plenum space 54 that is more or less equalized over the adjacent face of filter 46. Consequently, virtually all areas of the filter panels are put to work deodorizing the air being drawn through the panels and discharged by blower 56, and the processing efficiency and rate for the overall size and power consumption of the unit are maximized.

The significant advantages and features of the invention embodied in its preferred form extend to equivalent forms and are thus defined in the claims that follow.

I claim:

1. A portable air ventilating deodorizing filter device for toilets which include a toilet stool comprising a bowl having an upper rim and a base adapted to be positioned on a floor, comprising an elongated housing having a generally flat bottom and a top interconnected by opposite housing ends and sides to form an airtight enclosure, filter panel means mounted in upright position transversely spanning the housing interior substantially from top to bottom and side to side to divide the housing interior into a receiving plenum space in one end of the housing and a collecting plenum space in the opposite end of the housing, blower means operatively mounted in said housing having an outlet discharging through an opening in the housing and having an inlet communicating with the collecting plenum, intake means comprising an upright intake duct having a transversely disposed intake nozzle head on its upper end adapted for insertion between a toilet seat and said toilet bowl rim, an upright guide mounted inside said housing slidably supporting the intake duct in said receiving plenum to permit adjustive elevation of said nozzle head to different heights above the housing, said guide having means which permit the lower end of the intake duct to remain in communication with the receiving plenum in all vertically adjusted operative positions of said duct supported by said guide, said duct being retractable substantially fully within said housing to locate the nozzle head upon the top of the housing for carrying and stowage.

2. The filter device defined in claim 1 wherein the retracted nozzle head supported by the intake duct can be rotated about an upright axis from a position projecting laterally outward from the housing to a position substantially fully overlying the housing central portion in the duct's retracted position.

3. The filter device defined in claim 2 wherein the nozzle head has a downturned inlet extremity and the housing top has a recess accommodating the retracted nozzle head with space afforded in such recess to accommodate a person's fingers enabling lifting of the intake duct by way of the nozzle head inlet extremity serving as a carrying handle exerting cantilever force on the intake duct.

4. The filter device defined in claim 3 wherein the housing is slightly taller than half the height of the toilet stool and the combined intake duct and nozzle head can be slidably extended upwardly from the housing for the nozzle head to reach and rest upon the toilet bowl rim.

5. The filter device defined in claim 3 wherein the guide is tubular and both the guide and intake duct are circular in form enabling rotation of the duct in the guide to rotate the nozzle head.

6. The filter device defined in claim 5 wherein the tubular guide is mounted by means joined to the housing wall and said communication means comprises an elongated slot extending most of the length of said wall within the housing which allows air to flow directly into the receiving plenum.

7. The filter device defined in claim 6 wherein the blower has a discharge outlet and is mounted with said outlet discharging downwardly through an opening in the bottom of the housing, said housing bottom having a raised portion embodying said discharge opening and forming a channel that leads outward from beneath the housing for escape of discharged air through said channel.

8. The filter device defined in claim 7 wherein the housing is slightly taller than half the height of the toilet stool and the combined intake duct and nozzle head can be slidably extended upwardly from the housing for the nozzle head to reach and rest upon the toilet bowl rim.

9. The filter device defined in claim 7 wherein the housing is slightly taller than half the height of the toilet stool and the combined intake duct and nozzle head can be slidably extended upwardly from the housing for the nozzle head to reach and rest upon the toilet bowl rim.

10. The filter device defined in claim 1 wherein the blower has a discharge outlet and is mounted with said outlet discharging downwardly through an opening in the bottom of the housing, said housing bottom having a raised portion embodying said discharge opening and forming a channel for escape of discharged air out the sides from beneath the housing.

11. The filter device defined in claim 10 wherein the housing is slightly taller than half the height of the toilet stool and the combined intake duct and nozzle head can be slidably extended upwardly from the housing for the nozzle head to reach and rest upon the toilet bowl rim.

* * * * *

UNITED STATES PATENT AND TRADEMARK OFFICE
CERTIFICATE OF CORRECTION

PATENT NO. : 4,025,325
DATED : May 24, 1977
INVENTOR(S) : Vernon G. Goodwin

It is certified that error appears in the above-identified patent and that said Letters Patent are hereby corrected as shown below:

Column 8, line 17 (Claim 9), delete the numeral "7" and insert therefor --1--.

Signed and Sealed this sixteenth Day of August 1977

[SEAL]

Attest:

RUTH C. MASON
*Attesting Officer*

C. MARSHALL DANN
*Commissioner of Patents and Trademarks*